United States Patent [19]
Feil

[11] Patent Number: 5,058,007
[45] Date of Patent: Oct. 15, 1991

[54] NEXT MICROINSTRUCTION GENERATOR IN A MICROPROGRAM CONTROL UNIT

[75] Inventor: Peter J. Feil, Framingham, Mass.

[73] Assignee: Raytheon Company, Lexington, Mass.

[21] Appl. No.: 515,774

[22] Filed: Apr. 13, 1990

Related U.S. Application Data

[63] Continuation of Ser. No. 117,108, Nov. 5, 1987, abandoned.

[51] Int. Cl.[5] .................................................. G06F 12/00
[52] U.S. Cl. .................................. 364/200; 364/261.3; 364/261.7; 364/271.6; 364/263; 364/231.8
[58] Field of Search ... 364/200 MS File, 900 MS File

[56] References Cited

U.S. PATENT DOCUMENTS

| | | | |
|---|---|---|---|
| 3,990,054 | 11/1976 | Perlowski | 364/200 |
| 4,008,462 | 2/1977 | Kanda | 364/200 |
| 4,075,687 | 2/1978 | Nissen et al. | 364/200 |
| 4,118,773 | 10/1978 | Raguin et al. | 364/200 |
| 4,124,893 | 11/1978 | Joyce et al. | 364/200 |
| 4,155,120 | 5/1979 | Keefer et al. | 364/200 |
| 4,160,289 | 7/1979 | Bambara et al. | 364/200 |
| 4,168,523 | 9/1979 | Chari et al. | 364/200 |
| 4,210,960 | 7/1980 | Borgerson et al. | 364/200 |
| 4,298,927 | 11/1981 | Berglund et al. | 364/200 |
| 4,370,729 | 1/1983 | Bosch | 364/200 |
| 4,407,015 | 9/1983 | Ziobro | 364/200 |
| 4,430,706 | 2/1984 | Sand | 364/200 |
| 4,438,492 | 3/1984 | Harmon, Jr. et al. | 364/200 |
| 4,439,827 | 3/1984 | Wilkes | 364/200 |
| 4,446,518 | 5/1984 | Casamatta | 364/200 |
| 4,450,525 | 5/1984 | Demuth et al. | 364/200 |
| 4,488,224 | 12/1984 | Ippolito et al. | 364/200 |
| 4,587,611 | 5/1986 | Amdahl et al. | 364/200 |
| 4,604,691 | 8/1986 | Akagi | 364/200 |
| 4,827,402 | 5/1989 | Wada | 364/200 |
| 4,837,681 | 6/1989 | Fuller | 364/200 |
| 4,873,629 | 10/1989 | Harris et al. | 364/200 |

OTHER PUBLICATIONS

Myers, G. L., "Microinstruction Design", Digital System Design with LSI Bit-Slice Logic, Glenford J. Myers, John Wiley & Sons, Inc., (1980), pp. 211-220.

Primary Examiner—Stuart N. Hecker
Assistant Examiner—Rebecca L. Rudolph
Attorney, Agent, or Firm—Walter F. Dawson; Richard M. Sharkansky

[57] ABSTRACT

A microprogram control unit fetches a next microinstruction based upon a branch/no-branch condition which is determined by the processing of a current microinstruction and in concurrence with the processing of the current microinstruction. Both a branch microinstruction and a next sequential microinstruction are fetched from a microinstruction memory, but only one of them, based upon the branch condition, is transferred to a microinstruction register at the start of the next microinstruction.

22 Claims, 2 Drawing Sheets

NEXT MICROINSTRUCTION GENERATOR IN A MICROPROGRAM CONTROL UNIT

This application is a continuation of application Ser. No. 117,108 filed Nov. 5, 1987, now abandoned.

BACKGROUND OF THE INVENTION

This invention relates to a microprogram control unit of a digital data processor and more particularly to a microinstruction access apparatus associated therewith.

It has become common place in the computer industry to develop data processors which include a control store (cs) comprising a plurality of microinstructions for controlling the operation of a register and arithmetic/-logic unit (RALU). The control store is addressed based upon the contents of such microinstructions as well as other inputs depending upon the operation being executed in a data processor. Fetching the next microinstruction with its address conditionally based upon status information resulting from the execution of the current microinstruction is important in the data processor. If this was not done, then an additional microinstruction would be required because conditional addressing must be based upon status information generated by the execution of the previous microinstruction. Microprogram control and microinstruction design in the prior art are described in many references, one of which is "Digital System Design with LSI Bit-Slice Logic", Glenford J. Myers, John Wiley & Sons, Inc., 1980.

In addition, it is important that the fetching of the next microinstruction be performed in concurrence with the execution of the current microinstruction by the RALU. If this was not accomplished, the microinstruction execution time would be the sum of RALU execution time and the control store access time, and thus the total execution time would be significantly increased. Accordingly, it is desirable to fetch the next microinstruction with its address conditionally based upon status information resulting from the execution of the current microinstruction by the RALU in concurrence with the execution of the current microinstruction by the RALU. By providing such capability, the performance of the data processor is improved by neither requiring additional microinstructions nor slowing the microinstruction cycle time. Such a microprogram control store is shown and described in U.S. Pat. No. 4,587,611 to Gene M. Amdahl and Hsiao-Peng S. Lee and assigned to Amdahl Corporation of Sunnyvale, California. In Amdahl et al., a microprogram sequencing apparatus is disclosed having two or more control stores which enable a nonbranch address to fetch a first microinstruction from a first control store and a branch address to fetch a second microinstruction from a second control store. Since microinstructions from the branch and nonbranch addresses are concurrently available, no delay is encountered after the state of the branch condition is determined. However, additional hardware for the second control store is required to implement such microprogram sequencing apparatus.

SUMMARY OF THE INVENTION

In accordance with the present invention, a microprogram control unit of a data processing system is provided that fetches from a single microprogram memory both a branch microinstruction and a no-branch microinstruction during a microinstruction cycle and selects one of the accessed microinstructions to be the next microinstruction executed based upon the state of control signals generated by a processing and branch control unit having an RALU during the current microinstruction cycle. Each microinstruction word stored in the microprogram memory has a field that may be used as a branch address. An incrementer provides a next-in-order address (or a no-branch address) required during each microinstruction cycle.

In accordance with the present invention, a microprogram control unit for controlling a data processor is provided comprising a memory for storing a plurality of microinstructions, each one of the microinstructions having a field which may be used as a branch address for addressing the memory, microinstruction selection and latching means coupled to the output of the memory for providing either a current output of the memory or a previously latched output of the memory in accordance with the state of at least one condition signal generated during a current microinstruction cycle, a microinstruction register for storing a current microinstruction coupled to the output of the microinstruction selection and latching means, incrementer means for computing a next sequential address, address selection and latching means coupled to an output of the incrementer means for providing either the current output of the incrementer means or the previously latched output of the incrementer means in accordance with the state of the condition signal generated during the current microinstruction cycle, an address register for storing the next sequential address after the current microinstruction coupled to the output of the address selection and latching means, input control means for sequentially coupling an output of the address register and the branch address field of the current microinstruction to the inputs of the memory and the incrementer means during each microinstruction cycle, and output control means for generating a selection signal for controlling the microinstruction selection and latching means and the address selection and latching means in accordance with the condition signal generated during the current microinstruction.

In accordance with the present invention, a method is provided for generating a next microinstruction in a microprogram control unit comprising the steps of storing a plurality of microinstructions in a single memory, each one of the microinstructions having a field which may be used as a branch address for addressing the memory means, generating a next-in-order address, providing in sequence the next-in-order address and the branch address field of a current microinstruction to the memory means during each microinstruction cycle and selecting one of the outputs of the memory for a next microinstruction in accordance with the state of at least one condition signal generated during the current microinstruction cycle.

BRIEF DESCRIPTION OF THE DRAWINGS

Other and further features and advantages of the invention will become apparent in connection with the accompanying drawings wherein.

DESCRIPTION OF THE PREFERRED EMBODIMENT

Figure 1:
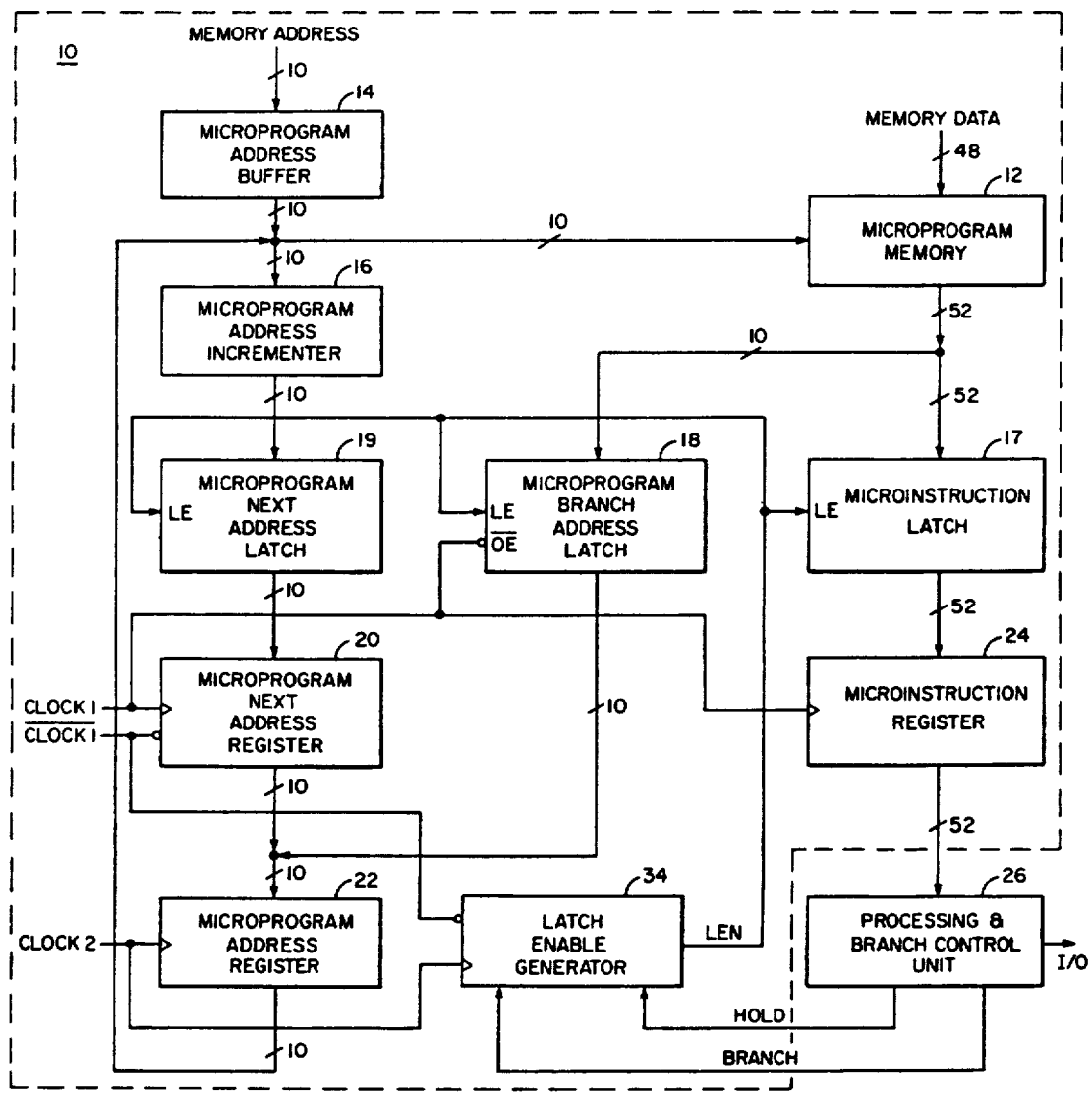
FIG. 1 is a block diagram of data processor showing a microprogram control unit for fetching microinstructions according to the invention.

Referring now to FIG. 1, there is shown a functional block diagram of a data processor 11 having a microprogram control unit 10 with the capability of fetching the next microinstruction based upon a branch/no-branch condition determined by the processing of the current microinstruction and in concurrence with this processing. This allows a next-in-order address and a branch address to access a microprogram memory 12, and one of the resulting accessed microinstructions is selected to be the next microinstruction, all of this occurring within one microinstruction cycle. The microprogram memory 12 comprises a plurality of stored microinstructions for implementing an operation required within a digital system. When the microprogram memory 12 is a write random access memory, then a microprogram address buffer 14, which is connected to the microprogram memory 12 address lines, provides addresses for memory locations to be loaded with microinstructions or other information. A microprogram address register 22 is also connected to the address lines of the microprogram memory 12 and provides the addresses for reading microinstructions from the microprogram memory 12 to be executed by the processing and branch control unit 26. Each word read from the microprogram memory 12 is coupled to a microinstruction latch 17, and the outputs from the microinstruction latch 17 are connected to a microinstruction register 24. The microinstruction register 24 stores a microinstruction word during its execution which controls the operation of a processing and branch control unit 26. The processing and branch control unit 26 performs arithmetic and logical operations on data under macroprogram control stored therein.

Still referring to FIG. 1, a microprogram address incrementer 16 is coupled to the outputs of microprogram address register 22 and the microprogram address buffer 14. When an address is transferred to the microprogram address incrementer 16, the address is incremented by one and the output from the microprogram address incrementer 16 is coupled to a microprogram next address latch 19. The microprogram address incrementer 16 operates on only 5 bits of the 10 bit address fed to it and the other 5 address bits are transferred directly through it since addressing is based on a 32 word page using branching to go from one page to another. The outputs of the microprogram next address latch 19 are connected to a microprogram next address register 20. The inputs of the microprogram address register 22 are connected to the outputs of the microprogram next address register 20 and also connected to the outputs of the microinstruction branch address latch 18. The inputs of the microinstruction branch address latch 18 are connected to a field of the outputs from the microprogram memory 12 which for some microinstructions contains a branch address. The latch enable generator 34 comprises and-or-invert logic known to one skilled in the art for generating a latch enable (LEN) signal in accordance with the assertion of HOLD and BRANCH signals. The HOLD and BRANCH signals are generated by the processing and branch control unit 26 and such signals in combination with CLOCK1 and CLOCK2 produce the LEN signal for coupling to the microinstruction latch 17, microprogram branch address latch 18 and microprogram next address latch 19. The logic state of the HOLD and BRANCH signals control whether a no-branch, a branch or a hold (repeat current microinstruction) operation shall occur.

Figure 2:
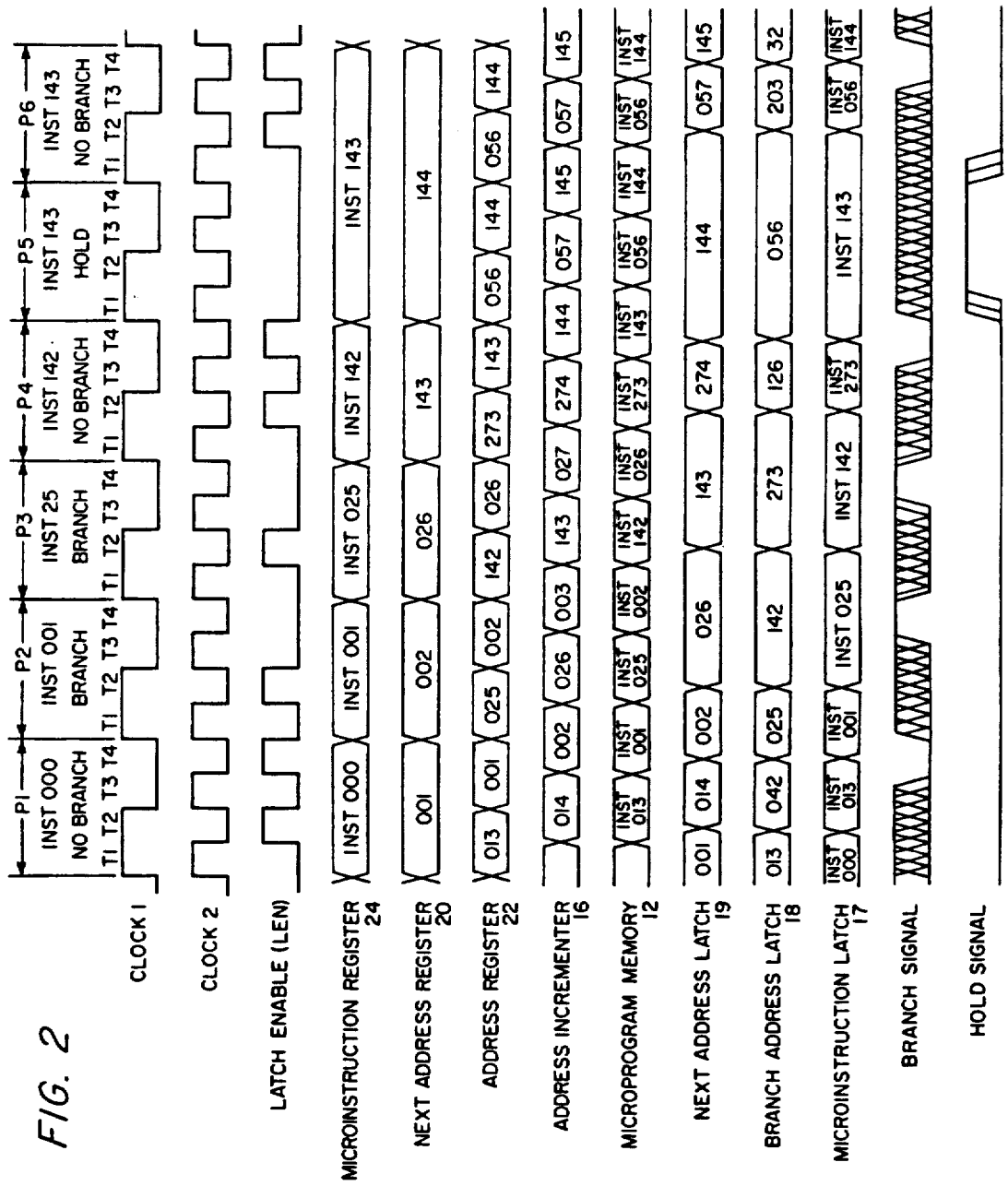
FIG. 2 is a timing diagram of the invention showing the contents of the microprogram control unit registers and latches for six typical microinstruction cycles.

Referring now to FIG. 1 and FIG. 2, the operation of the microprogram control unit 10 will be described. FIG. 2 is a timing diagram showing the operations being performed within the microprogram control unit 10 during six microinstruction cycles or periods P1 to P6, each microinstruction cycle comprising four timing periods, T1, T2, T3, and T4. The microinstructions shown comprise no-branch, branch and hold (repeat a microinstruction) operations. In the preferred embodiment, CLOCK1 has a 50% duty cycle and a period of 89.6 ns. CLOCK2 has a 50% duty cycle and a period of 44.8 ns. The start of a microinstruction is defined as the concurrent rising edges of CLOCK1 and CLOCK2. The four timing periods T1, T2, T3, and T4 are each 22.4 ns in duration and are delineated by the rising and falling edges of CLOCK2. The operation of the microprogram control unit 10 is controlled by two signals, BRANCH and HOLD from the processing and branch control unit 26 while executing the current microinstruction in the microinstruction register 24. BRANCH is sent from the processing and branch control unit 26 during T4 to indicate, if true, that the next microinstruction should be fetched from the address in the branch address field of the microinstruction, and if false, that the next microinstruction should be fetched from the next sequential address after the current microinstruction. HOLD is sent from the processing and branch control unit 26 during T2, T3, and T4 to indicate, if true, that the next microinstruction should be the same microinstruction as the one currently being executed, and if false, that the normal execution described above be performed.

As will be seen in the following description, at the completion of a microinstruction cycle, the microinstruction latch 17 will contain the next microinstruction, the microprogram branch address latch 18 will contain the possible branch address field of that next microinstruction, and the microprogram next address latch 19 will contain the next sequential address after that next microinstruction. At the start of a microinstruction cycle the next microinstruction is transferred from the microinstruction latch 17 to the microinstruction register 24, becoming the current microinstruction. Also, the microprogram next address is transferred from the microprogram next address latch 19 to the microprogram next address register 20, and the microprogram branch address is transferred from the microprogram branch address latch 18 to the microprogram address register 22. The microprogram address register 22 then presents the microprogram branch address to the microprogram memory 12 and the microprogram address incrementer 16. During T1 and T2, the microprogram memory 12 accesses the branch address and before the end of T2 has present at its outputs the addressed microinstruction. Also during T1 and T2, tee microprogram address incrementer 16 increments the branch address and before the end of T2 has present at its outputs the branch address plus one. During T2, if HOLD is false, then the signal LEN is asserted enabling the inputs of the microinstruction latch 17, the microprogram branch address latch 18, and the microprogram next address latch 19, thereby loading the microinstruction latch 17 with the possible branch addressed microinstruction from the microprogram memory 12, loading the microprogram branch address latch 18 with the branch address field of that microinstruction from the microprogram memory 12, and loading the microprogram next address latch 19 with next sequential address after that microinstruction from the microprogram address incrementer 16.

At the start of T3 the microprogram next sequential address is transferred from the microprogram next address register 20 to the microprogram address register 22. The microprogram address register 22 then presents the microprogram next address to the microprogram memory 12 and the microprogram address incrementer 16. During T3 and T4, the microprogram memory 12 accesses the next address and before the end of T4 has present at its outputs the addressed microinstruction. Also, during T3 and T4, the microprogram address incrementer 16 increments the next address and before the end of T4 has present at its outputs the next address plus one (current address plus 2). During T4, if HOLD is false and BRANCH is false, the signal LEN is again asserted thereby loading the microinstruction latch 17 with the next sequential microinstruction from the microprogram memory 12, loading the microprogram branch address latch 18 with the branch address field of that microinstruction from the microprogram memory 12, and loading the microprogram next address latch 19 with the current address plus two from the microprogram address incrementer 16.

The contents of the microinstruction latch 17, the microprogram branch address latch 18, and the microprogram next address latch 19 now contain the data required to execute the next microinstruction. If HOLD was true during T2, T3, and T4, these latches contain the same data as they did at the end of the last microinstruction because LEN was not asserted during this microinstruction cycle. Otherwise, if BRANCH was true during T4, these latches 17, 18 and 19 contain the data required to execute the microinstruction addressed by the branch field of the current microinstruction. Otherwise, such latches contain the data required to execute the next sequential microinstruction.

Table 1 is a list of microinstruction addresses corresponding to the address numbers used in FIG. 2, and defines a conditional branch address for a branch address field of a microinstruction stored in each microinstruction address. Therefore, for the six microinstruction cycles shown in FIG. 2 comprising no-branch, branch and hold operations, the contents of each register and latch is defined for each of the time periods T1 to T4 within each microinstruction cycle or period (P1 to P6).

TABLE 1

| Microinstruction Address | Conditional Branch Address |
| --- | --- |
| 000 | 013 |
| 001 | 025 |
| 013 | 042 |
| 025 | 142 |
| 056 | 203 |
| 142 | 273 |
| 143 | 056 |
| 144 | 032 |
| 273 | 126 |

For example, at the start of microinstruction cycle P1 the next microinstruction from address 000, which is temporarily in the microinstruction latch 17, is loaded into the microinstruction register 24. Also, the microprogram next address 001 is transferred from the microprogram next address latch 19 to the next address register 20, and the microprogram branch address 013 is transferred from the microprogram branch address latch 18 to the microprogram address register 22. The microprogram address register 22 then addresses the microprogram memory 12 with the branch address 013 and also transfers branch address 013 to the microprogram address incrementer 16 to be incremented by 1. During T1 and T2, the branch address 013 is accessed in microprogram memory 12 and the microinstruction is available at the memory 12 outputs. During T2, if the HOLD signal is false, then the signal LEN is asserted which loads the microinstruction from microprogram memory address 013 (INST 013) into the microinstruction latch 17, the address 014 from the microprogram address incrementer 16 into the microprogram next address latch 19, and the branch address 042 into the microprogram branch address latch 18. As shown in Table 1, the conditional branch address of the microinstruction stored in microprogram memory address location 013 is 042.

At the start of T3 during P1, address 001 in the microprogram next address register 20 is transferred to the microprogram address register 22 which presents address 001 to the microprogram memory, and during T3 and T4, the microinstruction stored in address 001 (INST 001) is available at the microprogram memory outputs. Also, during T3 and T4 address 001 is sent to the microprogram address incrementer 16 where it is incremented by one to 002 (current address 000 +two). During T4, since the HOLD signal is false and the BRANCH signal is false, the signal LEN is again asserted thereby loading the microprogram branch address latch 18 with address 025 (which is the branch address in the microinstruction just read from microprogram memory address 001 (see Table 1), loading the microinstruction latch 17 with the next sequential microinstruction from memory address 001 and loading the microprogram next address latch 19 with 002 from the microprogram address incrementer 16.

At the start of cycle P2 the next microinstruction from address 001 is loaded into the microinstruction register 24 from the microinstruction latch 17 because no BRANCH signal occurred during cycle P1; also the microprogram next address 002 is transferred from the microprogram next address latch 19 to the next address register 20, and the branch address 025 is transferred from the microprogram branch address latch 18 to the microprogram address register 22. The microprogram address register 22 then addresses the microprogram memory 12 with the branch address 025, and also transfers branch address 025 to the microprogram address incrementer 16 to be incremented by 1. During T1 and T2 the branch address 025 is accessed in microprogram memory 12 and the microinstruction from address 025 is available at the memory 12 outputs. During T2 since the HOLD signal is false, the signal LEN is asserted which loads the microinstruction from the microprogram address 025 into the microinstruction latch 17, the address 026 from the microprogram address incrementer 16 into the microprogram next address latch 19 and the branch address 142 into the microprogram branch address latch 18. As shown in Table 1, the conditional branch address of the microinstruction stored in microprogram memory address location 025 is 142.

At the start of T3 during P2, address 002 in the microprogram next address register 20 is transferred to the microprogram address register 22 which presents address 002 to the microprogram memory, and during T3 and T4 the microinstruction stored in address 002 is available at the microprogram memory outputs. However, during T4, since the HOLD signal is false but the BRANCH signal is true, a LEN signal does not occur so the contents of the microinstruction latch 17, the branch address latch 18 and the next address latch 18 do not change and their contents at the end of T2 remain the same at the end of T4 of P2, thereby providing for a branch address 25 operation to occur at the start of cycle P3. Likewise for microinstruction cycles P3 to P6, FIG. 2 shows the contents of the various elements of the microprogram control unit 10 during the time periods T1 to T4 of each cycle and based on the branch address defined in Table 1.

Referring again to FIG. 1, in the present embodiment the microprogram memory 12 is implemented with a 1024 word ×52 bit static read/write RAM. When it is loaded with microinstructions and other information, a 48 bit word is provided on the memory data lines. However, four additional bits beyond the 48 bit microinstruction are stored in the microprogram memory 12 in bit positions 48 to 51. These four additional bits beyond the 48 bit microinstruction are decodes of certain fields of the microinstruction which cannot be decoded during the microinstruction execution due to timing constraints; hence, the decodes are performed at the inputs of microprogram memory 12 as it is loaded.

The microprogram memory 12 comprises 13 devices (each being 1024×4 bits), part number AM 9150, manufactured by Advanced Micro Devices of Sunnyvale, Calif. 94088. The 54/74F type FAST integrated circuits may be used to implement the design of the microprogrammed control unit 10, and they are readily known to one skilled in the art. The microprogram address buffer 14 comprises two F244 octal buffers. The microprogram address incrementer 16 comprises an F283 4-bit binary full adder with fast carry, and a 2 input exclusive-or gate one quarter of an F86) implementing a 5-bit incrementer which provides a 32 microinstruction page size. The microinstruction latch 17, the microprogram branch address latch 18, and the microprogram next address latch 19, comprise nine F373 octal transparent latches with 3-state outputs. The microprogram next address register 20, comprises a pair of F374 octal D-type flip-flops with 3-state outputs. The microprogram address register 22 comprises a pair of F374 octal D-type flip-flops with 3-state outputs. The microinstruction register 24 comprises four F374 octal D-type flip-flops with 3-state outputs, a pair of F174 Hex D-type flip-flops with master reset, and a part of F175 Quad D-type flip-flops with complementary outputs and with master reset. The latch enable generator 34 comprises an F64 AND/OR invert gate. All of these TTL devices are manufactured by Fairchild of Mt. View, Calif. 94042.

This concludes the description of the preferred embodiment. However, many modifications and alterations will be obvious to one of ordinary skill in the art without departing from the spirit and scope of the inventive concept. Therefore, it is intended that the scope of this invention be limited only by the appended claims.

What is claimed is:

1. A microprogram control unit for generating microinstructions to control a data processing system comprising:

memory means for storing a plurality of microinstructions;

means coupled to address inputs of said memory means for providing to said memory means both a branch address from a current microinstruction being executed and a no-branch address for accessing said memory means sequentially during a current microinstruction cycle;

means for selectively generating a first and a second enable signals in response to said current microinstruction;

means coupled to said address providing means for incrementing the address coupled to said memory means in order to generate a next sequential address following a microinstruction being accessed by said address during said current microinstruction cycle;

means coupled between an output of said incrementing means and an input of said address providing means for storing a next microinstruction address at the end of said current microinstruction cycle in response to said first and said second enable signals generated during said microinstruction cycle;

means coupled to said memory means output for selecting a branch microinstruction or a no-branch microinstruction produced by said branch address and said no-branch address respectively, in response to said first and said second enable signals generated during said current microinstruction cycle; and means coupled to said selecting means for storing said selected microinstruction at the end of said current microinstruction cycle.

2. The microprogram control unit as recited in claim 1 wherein:
said memory means comprises a read/write random access memory.

3. The microprogram control unit as recited in claim 2 wherein:
said microprogram control unit further comprises a microprogram address buffer coupled to said memory means for providing addresses for loading said plurality of microinstructions into said memory means.

4. The microprogram control unit as recited in claim 1 wherein:
said memory means comprises a read-only-memory.

5. The microprogram control unit as recited in claim 1 wherein:
said branch address and said no-branch address providing means comprises a microprogram address register.

6. The microprogram control unit as recited in claim 1 wherein:
a processing and branch control means coupled to said microprogram control unit provides control signals for selecting the next microinstruction based on said current microinstruction being executed.

7. The microprogram control unit as recited in claim 6 wherein:
said control signals comprises a branch indicator generated by said processing and branch control means for selecting said branch microinstruction of said current microinstruction.

8. The microprogram control unit as recited in claim 6 wherein:

said control signals comprises a hold indicator generated by said processing and branch control means for repeating said current microinstruction.

9. A microprogram control unit for controlling a data processor comprising:

memory means for storing a plurality of microinstructions, each one of said microinstructions having a field which may be used as a branch address for addressing said memory means;

address register means coupled to address inputs of said memory means for providing to said memory means in clocked sequence during a current microinstruction cycle both a branch address from a current microinstruction and a no-branch next address for accessing said memory means sequentially during said current microinstruction cycle;

microinstruction selection and latching means coupled to the output of said memory means for providing during said current microinstruction cycle either a first output of said memory means in response to said branch address of a second output of said emory means in response to said no-branch next address in accordance with the state of a first and a second enable signals generated during said current microinstruction cycle;

microinstruction register means, coupled to the output of said microinstruction selection and latching means, for storing said current microinstruction;

incrementer means coupled to said address register means for computing a next address of a next microinstruction to follow the current microinstruction stored in said microinstruction register means;

next address selection and latching means coupled to an output of said incrementer means for temporarily storing either the current output of said incrementer means of the previously latched output of said incrementer means in accordance with the state of said first and said second enable signals generated during said current microinstruction cycle;

next address register means for storing the next sequential address after said current microinstruction, said next address register means having an input coupled to the output of said next address selection and latching means and an output coupled to said address register means input; and means for selectively generating a first and a second enable signals in response to said current microinstruction for gating said microinstruction selection and latching means and said address selection and latching means in accordance with control signals received during said current microinstruction cycle.

10. The microprogram control unit as recited in claim 9 wherein:
said memory means comprises a read/write random access memory.

11. The microprogram control unit as recited in claim 9 wherein:
said microprogram control unit further comprises a microprogram address buffer coupled to said memory means for providing addresses for loading said plurality of microinstruction into said memory means.

12. The microprogram control unit as recited in claim 9 wherein:
said memory means comprises a read-only-memory.

13. The microprogram control unit as recited in claim 9 wherein:
a processing and branch control means coupled to said enable signal generating means of said microprogram control unit provides control signals for generating said enable signal to participate in selecting said next microinstruction based on said current microinstruction being executed.

14. The microprogram control unit as recited in claim 13 wherein:
said control signals comprises a branch indicator generated by said processing and branch control means for selecting a branch microinstruction to be executed next.

15. The microprogram control unit as recited in claim 13 wherein:
said control signals comprises a hold indicator generated by said processing and branch control means for repeating said current microinstruction.

16. A microprogram control unit accessing microinstructions with both a sequential next address and a branch address within one microinstruction cycle comprising:

memory means for storing a plurality of microinstructions, each one of said microinstructions having a field which may be used as said branch address for addressing said memory means;

an address register coupled to said memory means for providing to said memory means in clocked sequence during a current microinstruction cycle both said branch address from a current microinstruction and said no-branch next address to fetch a next microinstruction within said one microinstruction cycle in accordance with the state of a first and a second enable signals;

a microinstruction latch coupled to said memory means output for temporarily storing said fetched microinstruction;

an address generator coupled to said address register for incrementing a microinstruction address to provide a next sequential address following a microinstruction being accessed during said microinstruction cycle;

a next address latch coupled to the output of said next address generator for temporarily storing said generated next sequential address;

a next address register coupled to said next address latch for storing said generated next sequential address, the output of said next address register being coupled to said address register input;

a branch address latch coupled to said branch address field of said memory means output for temporarily storing said branch address of a current microinstruction, said address register input being coupled to said branch address latch output; and a latch enable generator having an output coupled to said next address latch, said branch address latch and said microinstruction latch, for selectively generating said first and said second enable signals during said current microinstruction cycle in accordance with the state of input control signals generated during the operation of said current microinstruction.

17. The microprogram control unit as recited in claim 16 herein:
said microprogram control unit comprises a microinstruction register coupled to said microinstruction latch for storing said current microinstruction.

18. The microprogram control unit as recited in claim 16 wherein:
   said memory means comprises a read/write random access memory.

19. The microprogram control unit as recited in claim 16 wherein:
   said control unit further comprises a microprogram address buffer coupled to said memory means for providing addresses for loading said plurality of microinstruction into said memory means.

20. The microprogram control unit as recited in claim 16 wherein:
   said memory means comprises a read-only-memory.

21. A method of generating a next microinstruction in a microprogram control unit of a data processing system comprising the steps of:
   storing a plurality of microinstructions in a memory means, each one of said microinstructions having a field which may be used as a branch address for addressing said memory means;
   providing to said memory means in clocked sequence during a current microinstruction cycle both a branch address from a current microinstruction and a no-branch address from a current microinstruction and a no-branch next address from an address register means coupled to address inputs of said memory means for accessing said memory means sequentially during said current microinstruction cycle in accordance with the state of a first and a second enable signals;
   providing in a microinstruction selection and latching means coupled to the output of said memory means during said current microinstruction cycle either a first output of said memory means in response to said branch address or a second output of said memory means in response to said non-branch next address in accordance with the state of said first and said second enable signals generated during said current microinstruction cycle;
   storing said current microinstruction in a microinstruction register means coupled to the output of said microinstruction selection and latching means;
   computing a next sequential address of a next microinstruction following the current microinstruction stored in said microinstruction register means with an incrementer means coupled to said address register means;
   storing in a next address selection and latching means coupled to an output of said incrementer means either the current output of said incrementer means or the previously latched output of said incrementer means in accordance with the state of said enable signal generated during said current microinstruction cycle;
   storing the next sequential address after said current microinstruction in a next address register means coupled to the output of said next address selection and latching means; and
   generating in a selective manner said first and said second enable signals in response to said current microinstruction for gating said microinstruction selection and latching means and said address selection and latching means in accordance with control signals received during said current microinstruction cycle.

22. In a microprogram control unit, a method of accessing microinstructions with both a sequential next address and a branch address within one microinstruction cycle comprising the steps of:
   storing a plurality of microinstructions in a memory means, each one of said microinstruction having a field which may be used as a branch address for addressing said memory means;
   providing to said memory means from an address register both a branch address from a current microinstruction and a no-branch next address for accessing said memory means in a clocked sequential manner within said one microinstruction cycle in accordance with the state of a first and a second enable signals;
   generating in a selective manner said first and said second enable signals in response to said current microinstruction;
   generating with incrementing means a next sequential address following said current microinstruction accessed from said memory means during said current microinstruction cycle;
   storing said next sequential address after said branch address or said no-branch address at the end of said current microinstruction cycle in response to said first and said second enable signals generated during said current microinstruction cycle;
   selecting a branch microinstruction or a no-branch microinstruction accessed from said memory means in response to said first and said second enable signals generated during said current microinstruction cycle; and
   storing said selected microinstruction at the end of said current microinstruction cycle.

* * * * *